United States Patent Office 3,332,848
Patented July 25, 1967

3,332,848
MICROCRYSTALLINE CELLULOSE WITH STARCH IN NIACINAMIDE ASCORBIC ACID TABLET GRANULATIONS
Louis Magid, Clifton, N.J., assignor to Hoffmann-La Roche Inc., Nutley, N.J., a corporation of New Jersey
No Drawing. Filed July 10, 1963, Ser. No. 294,193
5 Claims. (Cl. 167—82)

This invention relates, in general, to novel multivitamin preparations and to a method for producing same. More particularly, the invention relates to vitamin-containing mixtures which are capable of being compressed into tablets; to methods of making said mixtures; and to the use of said mixtures in the preparation of multivitamin tablets.

Multivitamin tablets are not, in and of themselves, novel. Moreover, methods of making multivitamin tablets are not, per se, novel. For the most part, however, the presently available multivitamin tablets, and the previously disclosed processes for preparing same, leave much to be desired. For example, in one well-known prior art procedure, multivitamin tablets are obtained in a sequence of steps comprising first preparing a mixture consisting of stable vitamins and conventional excipients, granulating such mixture with an aqueous medium, drying the wet granulation, mixing same with labile vitamins and, finally, compressing the mixture which is thus obtained into tablets of desired size and weight. A second well-known and widely used method for the preparation of multivitamin tablets involves the steps of preparing a wet granulation containing certain of the ingredients which are to comprise the final product, drying such granulation and mixing the dried granulation with a second granulation containing the remaining ingredients of the final product. The second granulation which is used in such a procedure is produced by slugging. The mixture which is thus obtained is compressed into the desired tablets. A third method of preparing multivitamin tablets involves the granulation of ingredients of the product with alcohol, or some other suitable organic solvent, and the subsequent compression of such granulation into tablets. Each of these methods have disadvantageous features which minimize the value thereof. For example, in each of the described processes, distribution of the various ingredients throughout the granulation is quite often not uniform. As a result of this, tablets prepared from the granulation are similarly non-uniform. Moreover, such processes fall short of being completely satisfactory for another reason also. Each process utilizes a wet granulation which, at some stage of the process, requires drying. Drying operations are, of course, costly and time-consuming and, as such, decrease the efficiency and practical value of the processes.

In one of its embodiments, the present invention provides a granulation which is suitable for admixture with the active ingredients found in the conventional multivitamin tablets of the prior art.

In another embodiment, the invention provides a granulation, which has good flow characteristics and which, when admixed with one or more vitamins, can be compressed into tablets having the requisite hardness, disintegration, and uniformity characteristics.

In a still further embodiment, the invention provides highly useful multivitamin tablets produced using the aforementioned granulation as a base.

In another embodiment, the invention provides multivitamin tablets which are readily dispersible in aqueous vehicles and granulation suitable for use in preparing such tablets.

The base granulations which are used in preparing the tableted products of this invention comprise, as essential ingredients, (1) a niacinamide-ascorbic acid composition of the type described hereinafter, (2) a vegetable starch and (3) microcrystalline cellulose. Optionally, these granulations can contain tricalcium phosphate, dicalcium phosphate (anhydrous) or dicalcium phosphate dihydrate and/or an alkaline earth metal salt of a saturated fatty acid having a carbon chain length of from 12 to 18 carbon atoms.

In the preparation of the base granulations of this invention, there is employed a niacinamide-ascorbic acid composition. Such compositions include (a) granulations of niacinamide and ascorbic acid, (b) granulations of niacinamide and an alkali metal salt of ascorbic acid and (c) granulations of niacinamide, ascorbic acid and an alkali metal salt of ascorbic acid. Sodium ascorbate, potassium ascorbate and lithium ascorbate are representative of the alkali metal salts of ascorbic acid which are used in producing these granulations. Such granulations, hereinafter referred to, at times, generically merely as niacinamide-ascorbic acid compositions, are readily obtained by mixing thoroughly, at room temperature or higher, an aqueous wetted mixture of niacinamide with ascorbic acid and/or an alkali metal salt of ascorbic acid and subsequently drying and grinding the mixture. The mixture from which the desired niacinamide-ascorbic acid and/or the alkali metal salt of ascorbic acid granulation is obtained should contain from about 10 percent to about 35 percent by weight of niacinamide, and preferably from about 20 percent to about 30 percent by weight of niacinamide.

In general, any vegetable starch can be used in formulating the base granulations of this invention. For example, wheat starch, corn starch, rice starch, etc. can be employed. In preparing the granulations which are produced, and subsequently used, in the preferred embodiment of the invention, wheat starch is employed.

The base granulations of this invention contain a microcrystalline cellulose as a binder. A microcrystalline cellulose product which is sold by the American Viscose Corporation, Marcus Hook, Pa., under the trade name "Avicel" has been found to be especially well suited for use. While Avicel is used in the preferred embodiment of the invention, it will be understood that the invention is not restricted to the use of this commercially available product.

The quantities of the three essential ingredients which comprise the base granulation may vary. In general, however, the granulations will contain from about 25 percent to about 75 percent by weight of the niacinamide-ascorbic acid and/or ascorbate salt granulation; from about 1.0 percent to about 30.0 percent by weight, preferably from about 2.0 percent to about 15.0 percent by weight, of vegetable starch; and from about 5.0 percent to about 65.0 percent by weight, preferably from about 10.0 percent to about 60.0 percent by weight, of microcrystalline cellulose.

By varying the quantities of the various components within the ranges which have been specified heretofore, base granulation having varying properties can be obtained. For example, it has been found that a composition containing (1) at least about 25.0 percent by weight and up to about 45.0 percent by weight of the niacinamide-ascorbic acid and/or ascorbate salt granulation; (2) at least about 45.0 percent by weight and up to about 65.0 percent by weight of microcrystalline cellulose and (3) at least about 1.0 percent by weight and up to about 30.0 percent of vegetable starch, provides a granulation which is especially well suited for use in the production of multivitamin tablets which are readily dispersible in aqueous vehicles. Where, however, dispersibility of the produced tablets in an aqueous media is not a required or desired feature, the essential components of the product are admixed in such quantities to provide a base granulation containing (1) at least about 45.0 percent by weight and up to about 75.0 percent by weight of the niacinamide-ascorbic acid and/or ascorbate salt granulation; (2) at least about 5.0 percent by weight and up to about 45.0 percent by weight of microcrystalline cellulose and (3) at least about 1.0 percent by weight and up to about 30.0 percent by weight of vegetable starch. In granulations of the latter type, it is desirable, but not altogether necessary, to incorporate therein an excipient such as tricalcium phosphate, dicalcium phosphate (anhydrous) or dicalcium phosphate dihydrate. The amount of phosphate excipient used in such an embodiment of the invention can be varied. Generally, however, where a phosphate compound is used, there will be added to the granulation base, that is to the mixture of (a) the niacinamide-ascorbic acid composition (b) vegetable starch and (c) microcrystalline cellulose, from about 0.25 part to about 2.0 parts by weight of such phosphate compound for each part by weight of the total weight of the granulation base.

In the production of the multivitamin tablets of this invention, one can proceed in any one of several ways. For example, in one embodiment of the invention, the base granulation which has been described heretofore is prepared separately and the vitamin or vitamin mixture subsequently incorporated therein. In another embodiment, the essential ingredients, and any optional ingredients, of the granulation can be charged individually, or in any combination, in any order into a suitable vessel and mixed therein with the vitamin active material or materials. In either case, the various components are mixed together thoroughly and, subsequently, the granulation which is thus obtained is compressed into tablets of desired weight and size by conventional tableting techniques and procedures. Compression of the granulations into tablets is facilitated by the addition thereto of a conventional lubricant, such as an alkaline earth metal salt of a saturated fatty acid having a carbon chain length of from 12 to 18 carbon atoms. Calcium stearate is used as the lubricant in the preferred embodiment of the invention.

In general, the granulations described herein are suitable for use in the preparation of tablets containing any water-soluble or fat-soluble vitamin, or any combination of water-soluble or fat-soluble vitamins, found in conventional vitamin and multivitamin tablets of the prior art. These include, for example, vitamin $B_1$, vitamin $B_2$, vitamin $B_6$, vitamin $B_{12}$, calcium panthothenate, d-panthenol, pantothenamide as well as vitamin A and vitamin D. However, in view of the relative instability thereof, the latter vitamins are provided, preferably in the form of beadlets produced, for example, as described in U.S. Patent 2,756,177. Moreover, the tableted products of this invention can contain also the mineral supplements which are found in many of the mutlivitamin products of the art.

The present invention is significant in several respects. First and foremost, it provides a dry granulation base which is suitable for admixture with vitamins and capable of being compressed into tablets. Tablets which are produced using these granulations are characterized by their outstanding physical characteristics, for example, stability, hardness, ease of disintegration, uniformity, etc. Moreover, by variations of the formulations, within the limits prescribed herein, multivitamin tablets which are readily dispersible in aqueous vehicles can be obtained.

For a fuller understanding of the nature and objects of this invention, reference may be had to the following examples which are given merely as further illustrations of the invention and are not to be construed in a limiting sense. All parts given in the examples are parts by weight, unless otherwise indicated.

*Example 1*

In this example, a granulation was prepared by mixing the following-named ingredients in the quantities hereinafter indicated:

| | Parts |
|---|---|
| Niacinamide-ascorbic acid complex | 480 |
| Tricalcium phosphate | 342 |
| Wheat starch | 60 |
| Microcrystalline cellulose | 150 |

The niacinamide-ascorbic acid composition which was used in this example was prepared by granulating niacinamide and ascorbic acid with water, following which the wetted granulation was dried and ground. In producing this composition, there was employed a ratio of 22 parts of niacinamide and 58 parts of ascorbic acid. The microcrystalline cellulose used in this example was a product manufactured and sold by the American Viscose Corporation, Marcus Hook, Pa., under the trade name Avicel.

To the base granulation, produced as described in the preceding paragraph, there was added 6.0 parts of calcium stearate. Thereafter, the following-named ingredients were added to the granulation in the quantities hereinafter indicated.

| | Parts |
|---|---|
| Vitamin A/vitamin $D_2$ | 75 |
| Vitamin $B_2$ | 14 |
| Vitamin $B_6$ (hydrochloride) | 14 |
| Vitamin $B_1$ (mononitrate) | 16 |
| Vitamin $B_{12}$ (gelatin-coated) | 15 |
| d-Calcium pantothenate-calcium chloride complex | 30 |

The vitamin A/vitamin $D_2$ product used in this formulation was in the form of beadlets, containing 500,000 I.U. of vitamin A and 50,000 I.U. of vitamin $D_2$ per gram, produced and sold by Hoffman-La Roche Inc., Nutley, N.J., under the trade name, Palmabeads.

The mixture thus obtained was blended thoroughly until uniform. Thereafter, the mixture was passed through a 40 mesh screen. Subsequently, the mixture was slugged and ground through a mill to provide granules of approximately 12 mesh size.

Tablets were produced from the foregoing granulation by conventional procedures. Such tablets were tested for hardness using a Stokes Tablet Hardness Tester manufactured and sold by F. J. Stokes Corporation, Philadelphia, Pa. The observed hardness of the tablets was 6 kg. This reading expresses in kilograms the pressure required to crush the tablets.

In aqueous solution, the tablets of this example disintegrated in about five minutes.

*Example 2*

In this example, there was prepared multivitamin tablets which are readily dispersible in an aqueous media.

In producing these tablets there was first prepared a base granulation containing the following-named ingredients, in the quantities hereinafter indicated:

| | Parts |
|---|---|
| Niacinamide-ascorbic acid granulation (22:58) | 80 |
| Microcrystalline cellulose (Avicel) | 120 |
| Wheat starch | 5 |

These components were stirred until a substantially uniform mixture was obtained. To this mixture, there was added the following-named ingredients, in the quantities hereinafter indicated:

| | Parts |
|---|---|
| Vitamin A/vitamin $D_2$ | 12.5 |
| Vitamin $B_1$ (mononitrate) | 2.6 |
| Vitamin $B_2$ | 2.2 |
| Vitamin $B_6$ (hydrochloride) | 12.5 |
| Vitamin $B_{12}$ (in gelatin) | 2.5 |
| d - Calcium pantothenate - calcium chloride complex | 5.0 |

The vitamin A/vitamin $D_2$ substituent used in this example was the same Palmabeads product as employed in Example 1. The mixture was blended thoroughly, following which 1.0 part of calcium stearate was added thereto. Subsequently, 25.0 parts of a powdered-flavoring agent was added to the mixture. The mixture was blended and, thereafter, compressed, by conventional procedures, to tablets of compression weight 265 mg. The tablets, thus obtained, when tested by the method described in Example 1 were shown to have a hardness of 3 kg. In aqueous media, these tablets dispersed in about one minute.

*Example 3*

In this example, a granulation was prepared by mixing the following named ingredients in the proportions hereinafter indicated:

|  | Parts |
|---|---|
| Niacinamide-ascorbic acid granulation (22:58) | 480 |
| Dicalcium phosphate dihydrate | 124 |
| Tricalcium phosphate | 248 |
| Wheat starch | 30 |
| Microcrystalline cellulose (Avicel) | 150 |

The niacinamide-ascorbic acid granulation which was employed in this example was prepared in the same manner as the niacinamide-ascorbic acid granulation used in Example 1.

To this base granulation there was added 6.0 parts of calcium stearate. Thereafter, the following-named ingredients, in the quantities hereinafter, were added to, and mixed with, the granulation:

|  | Parts |
|---|---|
| Vitamin A/vitamin $D_2$ | 75 |
| Vitamin $B_2$ | 14 |
| Vitamin $B_6$ (hydrochloride) | 14 |
| Vitamin $B_1$ (mononitrate) | 14 |
| Vitamin $B_{12}$ (in gelatin) | 15 |
| d-Calcium pantothenate-calcium chloride complex | 30 |

The vitamin A/vitamin $D_2$ product used in the foregoing formulation was the same as that employed in Example 1.

The mixture, which was thus obtained, was blended thoroughly until uniform. Thereafter, the mixture was passed through a 40 mesh screen. Subsequently, the mixture was slugged and ground through a mill to provide granules of about 12 mesh size.

Tablets were produced from the foregoing granulation by conventional procedures. The tablets, thus obtained, had a hardness, as determined by the method described in Example 1, of 7 kg. In aqueous media, the tablets disintegrated in about 5 minutes.

*Example 4*

In this example, there was produced a granulation containing the following ingredients in the quantities hereinafter indicated:

|  | Parts |
|---|---|
| Niacinamide-ascorbic acid granulation (22:58) | 480 |
| Dicalcium phosphate dihydrate | 372 |
| Wheat starch | 30 |
| Microcrystalline cellulose (Avicel) | 150 |

The niacinamide-ascorbic acid granulates which were used in preparing this granulation were produced in the same manner as the niacinamide-ascorbic acid granulation employed in Example 1.

The granulation was mixed until subsequently uniform, following which 6.0 parts of calcium stearate and 75.0 parts of a vitamin A/vitamin $D_2$ product (Palmabeads) were added thereto and mixed therewith. The mixture which was thus obtained was blended thoroughly and, subsequently, it was passed through a 40 mesh screen. Thereafter, the mixture was slugged and ground through a mill to provide granules of about 12 mesh size.

Tablets were produced from the foregoing granulation by conventional procedures. Such tablets, when tested by the method described in Example 1, had a hardness of about 5.0 kg.

I claim:

1. A granulation consisting essentially of (1) from about 25 percent to about 75 percent by weight of a niacinamide-ascorbic acid composition, (2) from about 15.0 percent to about 30.0 percent by weight of vegetable starch and (3) from about 5.0 percent to about 65.0 percent by weight of microcrystalline cellulose, said niacinamide-ascorbic acid composition being a member selected from the group consisting of (a) a granulation of niacinamide and ascorbic acid, (b) a granulation of niacinamide and an alkali metal salt of ascorbic acid and (c) a granulation of niacinamide, ascorbic acid and an alkali metal salt of ascorbic acid, said niacinamide-ascorbic acid composition containing from about 10 percent to about 35 percent by weight of niacinamide.

2. The composition of claim 1 wherein there is present an alkaline earth metal salt of a saturated fatty acid having a carbon chain length of from 12 to 18 carbon atoms.

3. A composition consisting essentially of a member selected from the group consisting of water-soluble vitamins, fat-soluble vitamins and mixtures thereof in admixture with a granulation suitable for tableting, said granulation comprising (1) from about 25 percent to about 75 percent by weight of a niacinamide-ascorbic acid composition selected from the group consisting of (a) a granulation of niacinamide and ascorbic acid, (b) a granulation of niacinamide and an alkali metal salt of ascorbic acid and (c) a granulation of niacinamide, ascorbic acid and an alkali metal salt of ascorbic acid, (2) from about 15.0 percent to about 30.0 percent by weight of vegetable starch and (3) from about 5.0 percent to about 65.0 percent by weight of microcrystalline cellulose, said niacinamide-ascorbic acid composition containing from about 10 percent to about 35 percent by weight of niacinamide.

4. A composition in tablet form which is capable of dispersing rapidly in an aqueous media consisting essentially of a member selected from the group consisting of water-soluble vitamins, fat-soluble, vitamins and mixtures thereof in admixture with a granulation comprising (1) at least about 25 percent to about 45 percent by weight of a niacinamide-ascorbic acid composition selected from the group consisting of (a) a granulation of niacinamide and ascorbic acid, (b) a granulation of niacinamide and an alkali metal salt of ascorbic acid and (c) a granulation of niacinamide, ascorbic acid and an alkali metal salt of ascorbic acid, (2) from about 45 percent to about 65 percent by weight of microcrystalline cellulose and (3) from about 15.0 percent to about 30.0 percent by weight of vegetable starch, said niacinamide-ascorbic acid composition containing from about 10 percent to about 35 percent by weight of niacinamide.

5. The composition of claim 4 wherein there is present an alkaline earth metal salt of a saturated fatty acid having a carbon chain length of from 12 to 18 carbon atoms.

References Cited

UNITED STATES PATENTS

| 2,756,177 | 7/1956 | Cannalonga et al. | 167—81 |
| 2,887,436 | 5/1959 | Klioze et al. | 167—81 |
| 2,887,437 | 5/1959 | Klioze et al. | 167—81 |
| 3,146,168 | 8/1964 | Battista | 167—82 |
| 3,116,204 | 12/1963 | Siegel et al. | 167—81 |
| 3,175,948 | 3/1965 | Koff et al. | 167—81 |

LEWIS GOTTS, *Primary Examiner.*

J. S. LEVITT, S. K. ROSE, G. A. MENTIS,
*Assistant Examiners.*